(12) United States Patent
Samuel et al.

(10) Patent No.: US 12,735,953 B2
(45) Date of Patent: Sep. 15, 2026

(54) CALCULATING PULL FOR A STUCK DRILL STRING

(71) Applicant: Landmark Graphics Corporation, Houston, TX (US)

(72) Inventors: Robello Samuel, Cypress, TX (US); Rishi Adari, Katy, TX (US)

(73) Assignee: Landmark Graphics Corporation, Inc., Houston, TX (US)

( * ) Notice: Subject to any disclaimer, the term of this patent is extended or adjusted under 35 U.S.C. 154(b) by 150 days.

(21) Appl. No.: 17/361,586

(22) Filed: Jun. 29, 2021

(65) Prior Publication Data

US 2022/0412182 A1 Dec. 29, 2022

(51) Int. Cl.

| | |
|---|---|
| ***E21B 31/00*** | (2006.01) |
| ***E21B 47/007*** | (2012.01) |
| ***E21B 47/04*** | (2012.01) |
| ***E21B 47/09*** | (2012.01) |
| ***G01L 5/04*** | (2006.01) |
| *E21B 21/08* | (2006.01) |
| *E21B 44/00* | (2006.01) |
| *E21B 44/04* | (2006.01) |
| *E21B 47/00* | (2012.01) |
| *E21B 47/18* | (2012.01) |
| *E21B 49/08* | (2006.01) |

(52) U.S. Cl.

CPC ............ *E21B 31/00* (2013.01); *E21B 47/007* (2020.05); *E21B 47/04* (2013.01); *E21B 47/09* (2013.01); *G01L 5/04* (2013.01); *E21B 21/08* (2013.01); *E21B 44/00* (2013.01); *E21B 44/04* (2013.01); *E21B 47/00* (2013.01); *E21B 47/18* (2013.01); *E21B 49/08* (2013.01)

(58) Field of Classification Search

None

See application file for complete search history.

(56) References Cited

U.S. PATENT DOCUMENTS 3,033,114 A * 5/1962 Gieske ...................... F42D 1/05 102/202.3
3,942,373 A * 3/1976 Rogers .................... E21B 31/00 73/152.56

(Continued)

FOREIGN PATENT DOCUMENTS

WO 9521990 A1 8/1995

*Primary Examiner* — Arleen M Vazquez
*Assistant Examiner* — Leonard S Liang
(74) *Attorney, Agent, or Firm* — Michael Jenney; Parker Justiss, P.C.

(57) ABSTRACT

The disclosure presents processes and methods for determining an overpull force for a stuck drill string in a borehole system. The fluid composition of a mud in the borehole at a specified depth can be broken down into a percentage of liquid and percentage of solids, as well as adjusting for material sag and settling factors. The fluid composition can be utilized to identify friction factors and drag in respective fluid composition zones. Each friction factor and drag can be summed to determine a total fluid drag on the drill string. In some aspects, the total fluid drag can be adjusted utilizing the relative positioning of casing collars and tool joints. The total fluid drag can be summed with the other force factors, such as a shear force and mechanical drag. The total drag can then be utilized as the overpull force applied to the stuck drill string.

19 Claims, 7 Drawing Sheets

(56) References Cited

U.S. PATENT DOCUMENTS 3,994,163 A * 11/1976 Rogers .................... E21B 47/09 73/152.56
4,123,367 A * 10/1978 Dodd ...................... E21B 31/03 507/140
4,791,998 A * 12/1988 Hempkins ............... E21B 43/30 175/61
4,966,234 A 10/1990 Whitten
4,972,703 A * 11/1990 Ho ........................ E21B 47/007 175/45
5,086,646 A * 2/1992 Jamison ................... G01N 9/00 73/61.63
5,431,046 A * 7/1995 Ho .......................... E21B 44/04 73/152.59
5,503,228 A * 4/1996 Anderson ........... E21B 31/1135 166/301
5,660,239 A 8/1997 Mueller
6,176,323 B1 * 1/2001 Weirich ................ E21B 44/005 175/40
6,584,833 B1 * 7/2003 Jamison ................. G01N 15/04 73/54.39
7,163,059 B2 * 1/2007 Elder .................... E21B 31/035 166/301
7,980,310 B2 * 7/2011 Stoesz ..................... E21B 17/06 166/299
9,222,351 B2 * 12/2015 Jamison .................. E21B 21/08
9,567,853 B2 * 2/2017 Kulkarni ................. E21B 44/00
10,400,570 B2 * 9/2019 Erge ........................ E21B 44/00
2004/0216880 A1 * 11/2004 Tutuncu ................ E21B 31/005 166/301
2004/0262004 A1 * 12/2004 Roberts ................. E21B 31/005 166/301
2005/0071120 A1 * 3/2005 Hutchinson ............. E21B 44/00 702/150
2005/0126777 A1 * 6/2005 Rolovic .................. E21B 47/10 166/255.1
2005/0209836 A1 * 9/2005 Klumpen ......... G05B 19/41885 703/10
2006/0011387 A1 * 1/2006 Elder .................... E21B 31/035 175/72
2008/0087423 A1 * 4/2008 Wylie ...................... C09K 8/34 166/254.2
2010/0018701 A1 * 1/2010 Peter ....................... E21B 47/01 73/152.47
2010/0032208 A1 * 2/2010 Boyd .................... E21B 19/166 175/40
2013/0139583 A1 * 6/2013 Jamison ................. G01N 11/00 73/152.18
2013/0332089 A1 * 12/2013 Kulkarni ................ G01N 11/00 702/50
2014/0172305 A1 * 6/2014 Jamison .................. E21B 44/00 702/9
2014/0202772 A1 * 7/2014 Kulkarni ................. E21B 21/08 175/65
2015/0134257 A1 * 5/2015 Erge ...................... E21B 49/003 702/9
2016/0138395 A1 * 5/2016 Kulkarni ................. E21B 49/08 166/250.01
2016/0194947 A1 * 7/2016 Suparman ............... E21B 33/12 702/6
2017/0030156 A1 * 2/2017 Churchill .............. E21B 43/114
2017/0198553 A1 * 7/2017 Dykstra .................. E21B 21/01
2017/0241256 A1 * 8/2017 Erge ........................ E21B 33/14
2017/0328160 A1 * 11/2017 Arnaly .................... E21B 31/16
2018/0284735 A1 * 10/2018 Cella ...................... G06Q 30/02
2020/0173268 A1 6/2020 Zhang, Jr. et al.
2021/0404334 A1 * 12/2021 Kulkarni ................. E21B 44/00

* cited by examiner

CALCULATING PULL FOR A STUCK DRILL STRING

TECHNICAL FIELD

This application is directed, in general, to improving borehole operation efficiency and, more specifically, to determining information for a stuck drill string state.

BACKGROUND

In developing a borehole, such as when drilling operations are being conducted, the drill string, e.g., pipe, can become stuck. The stuck state can occur for various reasons, such as a borehole collapse, a build-up of cuttings, a settling of material, and other cause of a stuck drill string. Conventionally, an overpull force is calculated to determine the amount of force the surface equipment would need to exert on the drill string to remove the stuck drill string state. The overpull force may not account for all of the varying factors of friction and drag that could affect the drill string downhole. A more accurate calculation of the downhole forces effecting the overpull force calculation would be beneficial making the borehole operations more efficient with a reduction of the potential loss of equipment.

SUMMARY

In one aspect, a method disclosed. In one embodiment, the method includes (1) receiving input parameters of at least a torque parameter and a drag parameter for a drill string wherein the drill string is in a stuck state in a borehole, (2) determining a percentage of liquid of a mud at a first depth of the borehole and a percentage of solids of the mud at the first depth, (3) calculating one or more of an inside friction parameter at the first depth, a first insitu friction parameter utilizing the percentage of liquid, a second insitu friction parameter utilizing the percentage of solids, a shear force at the first depth, or an outside friction at the first depth, (4) calculating a total drag utilizing a mechanical drag and one or more of the inside friction parameter, the first insitu friction parameter, the second insitu friction parameter, the shear force, or the outside friction, and (5) generating an overpull force utilizing the total drag to update the torque parameter and the drag parameter.

In a second aspect, a system is disclosed. In one embodiment, the system includes (1) a data transceiver, capable of receiving input parameters from one or more of downhole sensors of a borehole undergoing drilling operations, surface sensors proximate the borehole, a data store, a previous survey data, a well site controller, a drilling controller, or a computing system, wherein the input parameters include sensor data of a fluid composition of a mud at a first depth in the borehole, a drill string is coupled to a surface location and extends into the borehole, and the drill string is in a stuck state, (2) a result transceiver, capable of communicating an output parameter, wherein the output parameter comprises one or more of an overpull force, a threshold depth, a backoff depth, or a safety factor, and (3) a pull force processor, capable of using at least one of the input parameters to generate the output parameter.

In a third aspect, a computer program product having a series of operating instructions stored on a non-transitory computer-readable medium that directs a data processing apparatus when executed thereby to perform operations. In one embodiment, the operations include (1) receiving input parameters of at least a torque parameter and a drag parameter for a drill string wherein the drill string is in a stuck state in a borehole, (2) determining a percentage of liquid of a mud at a first depth of the borehole and a percentage of solids of the mud at the first depth, (3) calculating one or more of an inside friction parameter at the first depth, a first insitu friction parameter utilizing the percentage of liquid, a second insitu friction parameter utilizing the percentage of solids, a shear force at the first depth, or an outside friction at the first depth, (4) calculating a total drag utilizing a mechanical drag and one or more of the inside friction parameter, the first insitu friction parameter, the second insitu friction parameter, the shear force, or the outside friction, and (5) generating an overpull force utilizing the total drag to update the torque parameter and the drag parameter.

BRIEF DESCRIPTION

Reference is now made to the following descriptions taken in conjunction with the accompanying drawings, in which.

DETAILED DESCRIPTION

Figure 1:
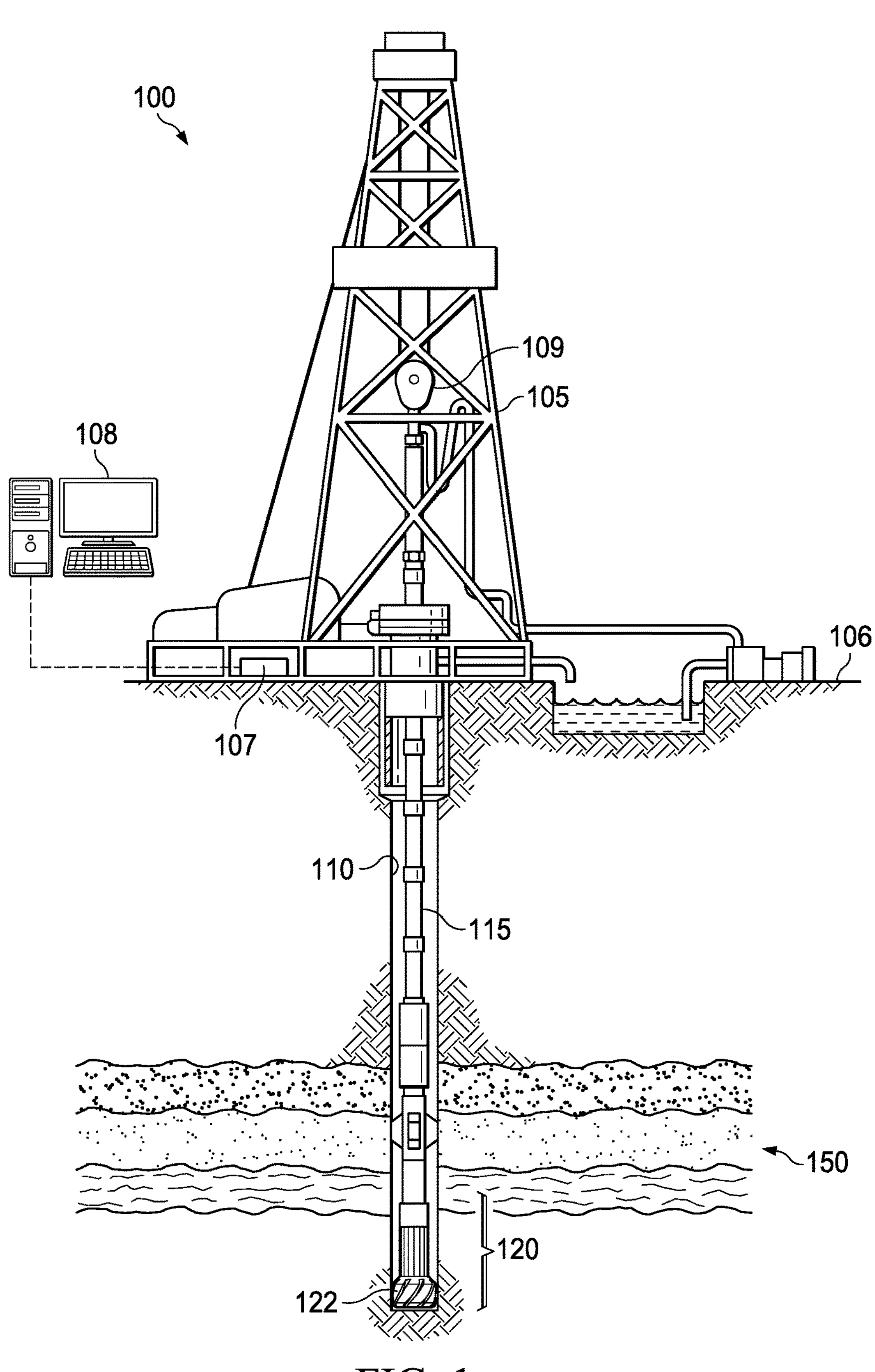
FIG. 1 is an illustration of a diagram of an example drilling borehole system calculating a pull force for a stuck drill string.

When developing a borehole, multiple types of borehole operations can be employed, such as drilling, trip in of a drill string, trip out of a drill string (i.e., drill pipe operations), extraction, and other borehole operations. Borehole operations can be affected by friction against the casing, the subterranean formation, and the accumulation of borehole material, e.g., cuttings or subterranean formation material, in the borehole. The friction affects can be in one or more portions of the borehole. For example, a drilling fluid can accumulate cuttings and thereby increase the friction force against a rotating drill string, or the drill string can experience friction against a casing or subterranean formation, such as in a bend or dogleg portion of the borehole. A borehole can be developed for hydrocarbon production purposes, scientific purposes, research purposes, or for other purposes that have operations occurring within a borehole.

As the borehole materials build up within the borehole, an increase in friction with the drill string and equipment attached to the drill string can occur. The borehole material can include, for example, additives added to the drilling fluid or mud, material from the subterranean formation surrounding the borehole, cuttings, portions of downhole tools (e.g., worn off portions or broken tools), or other types of material downhole. Should the borehole material collect, e.g., build up, to a sufficient amount, the downhole operations of the drill string and drilling equipment can be negatively affected. For example, the friction can increase to a factor that severely impacts operations or prevents an operation, for example, a packoff event causing a stuck drill string. The build-up of borehole material can occur more frequently in a lateral or horizontal portion of the borehole where the bed height of the borehole material can build-up and interfere with the operations of the drill string and drilling assembly.

When the drill string is stuck either through differential pipe sticking or mechanical sticking (such as from a packoff event), proper pull can be calculated to release the stuck condition. Conventionally, the calculations may utilize assumptions of factors or variables, such as a friction factor, a length of the stuck condition, a differential pressure in scenarios of differential pressure sticking, or mechanical load in scenarios of mechanical sticking.

During a differential stuck condition, while pulling or backoff operations are in progress, overpull can be applied at the surface to overcome the stuck force. Typically, the pull force can be calculated utilizing a differential pressure, a contact length, and a friction between the drill string and a mud cake (which can be adjusted due to the mud cake thickness). This calculation can be valid if the pull force is applied immediately. As time progresses, for example, due to a delay in operations, a delay in gathering the inputs for the calculations, and other types of delays, the drilling fluid can separate into different phases due to gravity. Barite sag, i.e., barite settlement or other material sag, can create additional parameters that would need to be accommodated in a form of fluid frictional drag when pulling the drill string. In order to have a better estimate of the overpull required, a comprehensive calculation is needed. This can also provide an accurate estimate of the pull force within the yield strength of the drill string.

This disclosure presents solutions to calculate an overpull parameter which can be utilized to determine the amount of force that can be applied to a drill string to put the stuck drill string into a non-stuck drill string state. The drill string can be composed of various materials, for example, titanium, aluminum, steel, plastics, other materials, or combinations thereof. The material composing the drill string can be utilized in the analysis to determine a maximum pull force prior to a breaking or damaging of the drill string. Conventional models can be modified to utilize fluid friction force coupling parameters. Fluid friction forces can be calculated utilizing the composition of the downhole fluid, e.g., mud, such as the solid and fluid percentages. Existing models in the industry utilize cement bond logs (CBL) and tools data. These solutions present a coupled model utilizing logs, data, physics parameters, engineering parameters, and tools data.

A barite sag problem, e.g., material sag, can occur when the fluid is in a static condition. In some aspects, a geometrical consideration can be incorporated into the pull calculation, such as tool joints if the string is a portion of piping, or coupling if the string is a portion of casing. The fluid friction forces due to the geometrical changes can be substantial. The annulus sediments may not flow around the tool joints or couplings, which can result in a resistance or friction and thus more pull force would be needed to overcome the additional resistance or friction. The rate of sedimentation can depend on, for example, a pressure parameter, a temperature parameter, a base fluid composition, rheological properties, content of the borehole, and a time parameter.

A calculation of a percentage of solids within the fluid composition and a length of the plug can be utilized to determine the fluid friction forces for the pull calculation. In some aspects, the percentage of solids and the length of the plug can be determined using laboratory testing of experimental data using the mud composition for various time periods. In some aspects, the percentage of solid and the length of the plug can be determined by utilizing borehole logging tools. Borehole logging tools, such as nuclear sensors, CBL tools, ultrasonic devices, or a combination of tools, can be used to measure the annular content between the drill string and the wellbore or the casing wall. In some aspects, the borehole logging tools can provide the bonding characteristics of materials, such as mud, solid cement, settled drilling mud, water, drilled cuttings, hydrates, or combinations thereof.

The total drag force created by the fluid friction and mechanical friction can be calculated using the additional fluid friction forces. The total drag force can be incorporated into a drill string solution to determine a total hook load and a total overpull force that would be sufficient to release a stuck drill string.

The pull force can include the frictional drag between the drill string and the formation, the fluidic drag due to the drill string-drilling fluid, e.g., mud, interaction, and the pipe buoyant weight. Fluidic drag can be estimated by using the outer surface area in contact with the contaminants, such as using Equation 1. The total fluidic drag is equal to the fluid drag inside the drill string (e.g., inside friction parameter) plus (the percentage of liquid in the fluid composition times the fluid drag outside of the drill string) plus (one minus the percentage of liquid in the fluid composition times the solid drag outside of the drill string) plus the shear fore outside of the drill string.

Example fluidic drag Equation 1

$$F = (fluidDrag_{inside} * l) + (percentLiquid * dragCoeff_{liquid} * l) + ((1 - percentLiquid) * dragCoeff_{solid} * l) + shearForce$$

where F is the total fluid drag, $fluidDrag_{inside}$ is the fluid drag inside the drill string, percentLiquid is the percentage of liquid of the fluid, e.g., mud, outside of the drill string, $dragCoeff_{liquid}$ is the drag coefficient of the liquid on the outside of the drill string, $dragCoeff_{solid}$ is the drag coefficient of the solids in the fluid on the outside of the drill string, l is the length of the portion of the drill string being evaluated, and shearForce is the shear force outside of the drill string.

The total drag is the mechanical drag plus the total fluid drag. A loss in external pressure can be determined as shown in Equation 2.

Equation 2: Example loss in external pressure force $$\Delta P_{ext} \cdot \pi \cdot (D_h^2 - D_p^2)/4 = \tau_w \cdot \pi \cdot (D_h - D_p) \cdot L$$

where $$D_h^2 - D_p^2$$

is the calculated diameter, $\tau_w$ is wall sheer stress, and

L is a length parameter.

The shearForce on the outer diameter of the drill string or casing for a length of drill string l can be determined using Equation 3.

Example shear force calculation Equation 3

$$\Delta\text{Force} = \frac{\Delta P \cdot \pi \cdot (D_h^2 - D_p^2) \cdot D_p}{4 \cdot (D_h - D_p)}$$

The loss in pressure force can be ratioed between the surface areas of the drill string and the hole diameters. The shear force on the inner diameter of the drill string or casing for the specified length 1 of drill string can be represented by Equation 4.

Equation 4

Example shear force on inside diameter of drill string or casing $$\Delta\text{Force} = \frac{\Delta P \cdot \pi \cdot (D_i^2)}{4}$$

where ΔForce is the shear force,

ΔP is the change in pressure, and $D_i$ is the internal diameter of the drill string.

In some aspects, a machine learning system or a deep neural network system can be utilized that can receive the input parameters and determine the fluid drag, mechanical drag, and total drag. As new information is communicated to the machine learning system or deep neural network system, the accuracy of the outputs can increase, thereby reducing an uncertainty of the fluid drag and mechanical drag input parameters. For example, feedback from the output parameter can be used to train the machine learning or the deep neural network system. In some aspects, the methods and processes described herein can be utilized to analyze historical data to improve the accuracy of the machine learning system or deep neural network system.

In some aspects, the methods and processes described herein can be encapsulated as a function or a series of functions, for example, one or more microservices, which can be accessed by the drilling operation or another borehole operation. For example, a first function, e.g., microservice, can be utilized to calculate a drag of a liquid component of the mud, a second function can be utilized to calculate a drag of a solid component of the mud, a third function can be utilized to calculate a mechanical drag, and other functions can add the other components, such as shear force, and to calculate a total drag and total pull force needed to overcome the drag.

In some aspects, the drilling operations can be directed by a drilling controller, a well site controller, a bottom hole assembly (BHA), a proximate computing system, an edge computing system, or a distant computing system, for example, a cloud environment, a data center, a server, a laptop, a smartphone, or other computing systems. In some aspects, a portion of the disclosed methods and processes can be performed by downhole tools, such as by a drilling assembly or a reservoir description tool.

Turning now to the figures, FIG. 1 is an illustration of a diagram of an example drilling borehole system 100 calculating a pull force for a stuck drill string. Drilling borehole system 100 can be a drilling system, a logging while drilling (LWD) system, a measuring while drilling (MWD) system, a seismic while drilling (SWD) system, a telemetry while drilling (TWD) system, and other hydrocarbon well systems, such as a relief well, an intercept well, a well undergoing an automatic drilling condition, or a system using a completion string. Drilling borehole system 100 includes a derrick 105, a well site controller 107, and a computing system 108. Well site controller 107 includes a processor and a memory and is configured to direct operation of drilling borehole system 100. In some aspects, well site controller 107 can be a drilling controller. Derrick 105 is located at a surface 106.

Derrick 105 includes a traveling block 109 that includes a drill string hook. Traveling block 109 includes surface sensors to collect data on hook-load and torque experienced at traveling block 109. Extending below derrick 105 is a borehole 110, e.g., an active borehole, with downhole tools 120 at the end of a drill string 115. Downhole tools 120 can include various downhole tools and BHA, such as drilling bit 122. Other components of downhole tools 120 can be present, such as a local power supply (e.g., generators, batteries, or capacitors), telemetry systems, downhole sensors, transceivers, and control systems. The various sensors can be one or more of one or more downhole sensors or one or more surface sensors, such as a CBL, that can provide one or more collected or measured parameters to other systems. The collected or measured parameters can be pressure parameters, temperature parameters, or composition parameters of the mud at specified locations within borehole 110. The collected or measured parameters can be casing wear parameters or drill string wear parameters at specified locations within borehole 110. Other collected and measured parameters can be collected as well. The collected or measured parameters can be utilized as input parameters to the disclosed processes and methods.

Borehole 110 is surrounded by subterranean formation 150. Well site controller 107 or computing system 108 which can be communicatively coupled to well site controller 107, can be utilized to communicate with downhole tools 120, such as sending and receiving telemetry, data, drilling sensor data, instructions, and other information, including collected or measured parameters, cuttings and other material parameters, bed heights, weighting parameters, location within the borehole, a cuttings density, a cuttings load, a cuttings shape, a cuttings size, a deviation, a drill string rotation rate, a drill string size, a flow regime, a hole size, a mud density, a mud rheology, a mud velocity, a pipe eccentricity, and other input parameters.

Computing system 108 can be proximate well site controller 107 or be distant, such as in a cloud environment, a data center, a lab, or a corporate office. Computing system 108 can be a laptop, smartphone, PDA, server, desktop computer, cloud computing system, other computing systems, or a combination thereof, that are operable to perform the processes and methods described herein. Well site operators, engineers, and other personnel can send and receive data, instructions, measurements, and other information by various conventional means with computing system 108 or well site controller 107.

In some aspects, a pull force processor can be part of well site controller 107 or computing system 108. The pull force processor can receive the various input parameters, such as from a data source, previous survey data, laboratory test data, real-time or near real-time data received from sensors downhole or at a surface location, and perform the methods and processes disclosed herein. The results of the analysis can be communicated to a drilling operations system, a geo-steering system, or other well site system or user where the results can be used as inputs to direct further borehole operations. In some aspects, computing system 108 can be located with downhole tools 120 and the computations can be completed at the downhole location. The results can be communicated to a drilling system, a drilling controller, or to a drilling operation system downhole or at a surface location.

The received results, such as a calculated minimum pull force needed to unstick a stuck drill string, can be used by traveling block 109 to implement the overpull force on drill string 115. Traveling block 109 can utilize hook load measurements to adjust the overpull force exerted on drill string 115.

FIG. 1 depicts an onshore operation. Those skilled in the art will understand that the disclosure is equally well suited for use in offshore operations. FIG. 1 depicts a specific borehole configuration, those skilled in the art will understand that the disclosure is equally well suited for use in boreholes having other orientations including vertical boreholes, horizontal boreholes, slanted boreholes, multilateral boreholes, and other borehole types.

Figure 2:
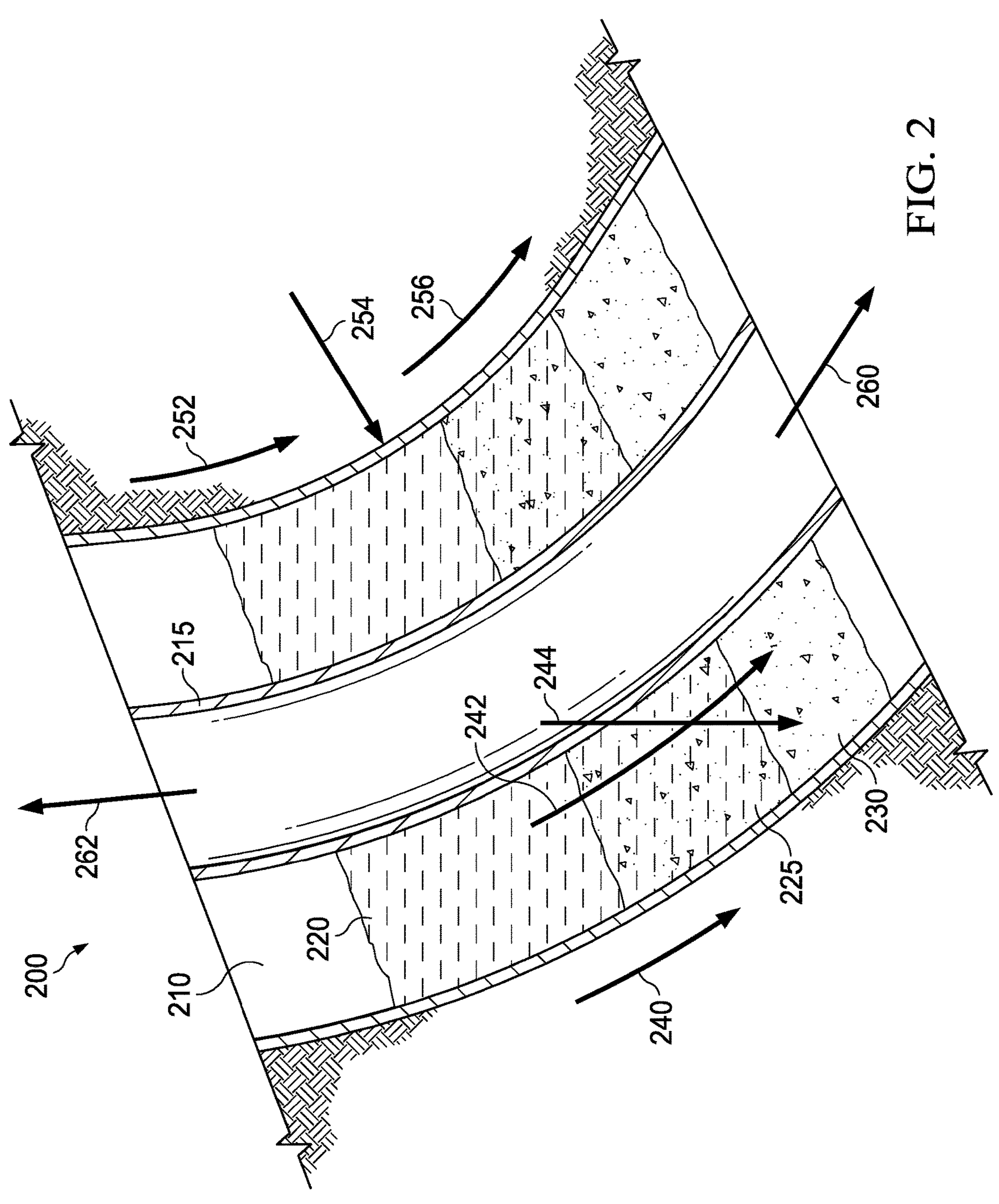
FIG. 2 is an illustration of a diagram of an example borehole system with fluid friction effecting the drill string.

FIG. 2 is an illustration of a diagram of an example borehole system 200 with fluid friction effecting the drill string. As drilling operations progress, cuttings, mud, including additives to the mud, and other borehole material can settle around the drill string and cause a stuck drill string state. Borehole system 200 has an active borehole 210 where inserted within is a drill string 215. Active borehole 210 is a portion of a borehole and has a curved borehole geometry. Material sag 220, such as barite or other types of solids, is shown settling out of the mud pumped into active borehole 210. Contaminated cement 225 has separated from material sag 220 and a cement 230. Material sag 220, contaminated cement 225, and cement 230 can experience differing friction forces against drill string 215, and can be evaluated as separate friction zones across their respective depth ranges. Calculating each contribution to the overall drag force experienced by drill string 215 would be beneficial.

Force arrow 240 shows the direction contaminated cement 225 flows in this example. Force arrow 240 can be represented by $\mu_s F_s$. Force arrow 242 shows the direction of the material sag 220 flow in this example. Force arrow 242 can be represented by $\mu F_n$. Force arrow 244 shows the direction of the force exerted by gravity on the various materials in active borehole 210. Force arrow 252 shows the direction of the force exerted by mud in this example. Force arrow 252 can be represented by $\mu_f F_f$. Force arrow 254 shows the direction of the force exerted by active borehole 210 in this example. Force arrow 254 can be represented by $F_n$. Force arrow 256 shows the direction of the force exerted by contaminated cement 225 in this example. Force arrow 256 can be represented by $\mu_f F_f$. Force arrow 260 shows the direction of the force exerted by drill string 215 in this example. Force arrow 260 can be represented by Ft. Force arrow 262 shows the direction of the force exerted by a traveling block or other surface equipment on drill string 215 in this example. Force arrow 262 can be represented by $F_t + \Delta F_t$.

Equation 5 can be utilized to calculate the drag of friction on drill string 215, such as using a soft string method.

Example calculation of the total pull force — Equation 5

$$F_n\left[(F_t \Delta \emptyset \sin\alpha)^2 + (F_t \Delta\alpha + W \sin\alpha)^2\right]^{1/2} + \sum_{i=1}^{n} \mu_s F_s^i + \sum_{i=1}^{n} \mu_f F_f^i$$

$$\Delta F_t = \mu F_n + W \cos\alpha$$

where α is the inclination of the flow of borehole material compared to that of the gravitational force, where a vertical borehole geometry has a zero inclination, θ is the angle from a horizontal line to the line of force that a material within the borehole exerts on the drill string, F is the force component, the $_t$ subscript is a total, the $_s$ subscript is for the solid components, the $_f$ subscript is for the fluid components, i is the depth of interest, n is the total number of depths of interest (e.g., each friction zone), and μ is the coefficient of friction for each of the respective components.

Figure 3:
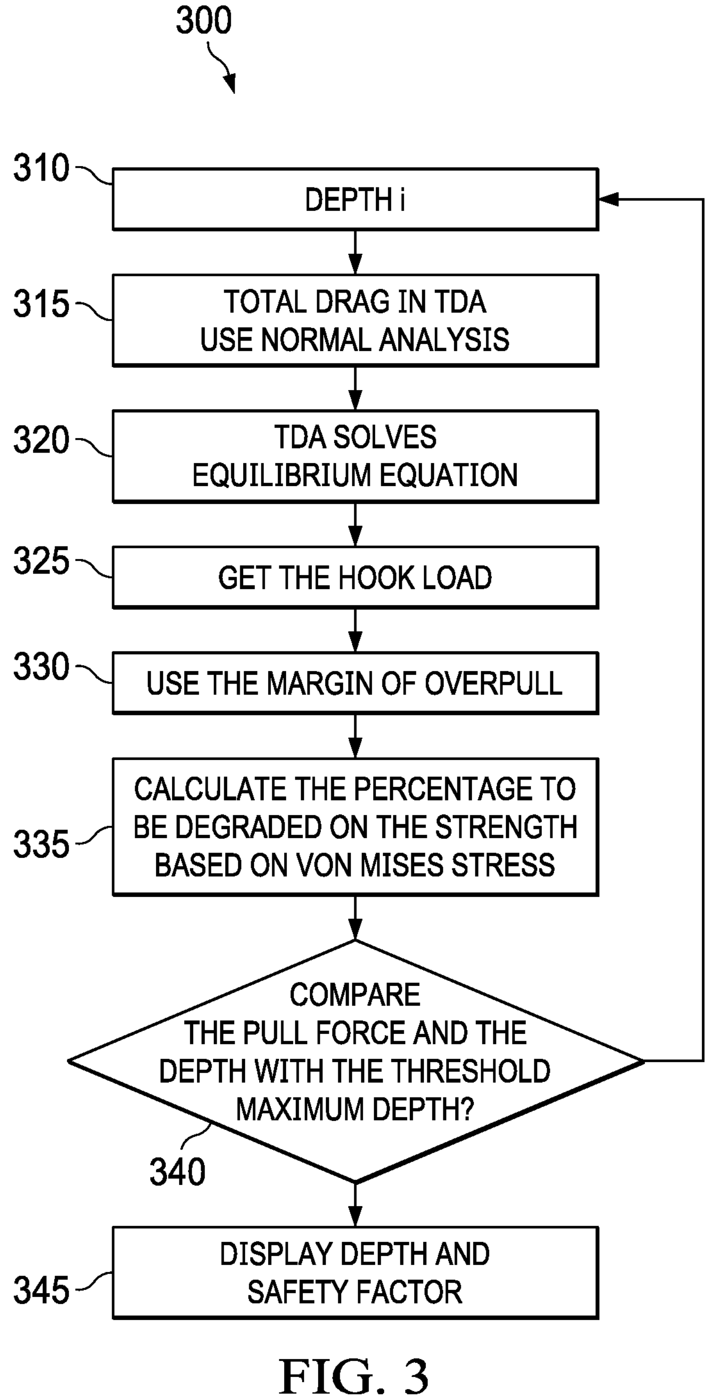
FIG. 3 is an illustration of a diagram of an example functional flow calculating a pull force.

FIG. 3 is an illustration of a diagram of an example functional flow 300 calculating a pull force. Functional flow 300 demonstrates an example functional flow for the disclosed processes. Functional flow 300 starts in a block 310 where a depth i of interest can be specified. The depth can be a range of depths, for example, 15,300 feet to 15,400 feet. In a block 315, a total drag analysis (TDA) can be conducted utilizing conventional drag models and calculations. In a block 320, the TDA function can solve the equilibrium equations. In a block 325, the hook load can be determined. In a block 330, the margin of overpull can be calculated utilizing the known parameters of the drill string and the calculate drag forces.

In a block 335, the margin of overpull can be degraded by a percentage calculated from the von Mises stress parameters. In a block 340, the margin of overpull and depth can be compared to the threshold maximum depth. If the comparison is not satisfied, then the functional flow can return to block 310 and a deeper depth can be evaluated. If the comparison is satisfied that the maximum depth possible has been identified, that can be safely pulled out of the borehole by the surface equipment, in a block 345 the depth, safety factors, and other pull parameters can be utilized by the drilling operations or displayed to a user for user approval or intervention. A back-off operation is more cost effective than a cut and pull operation.

Figure 4:
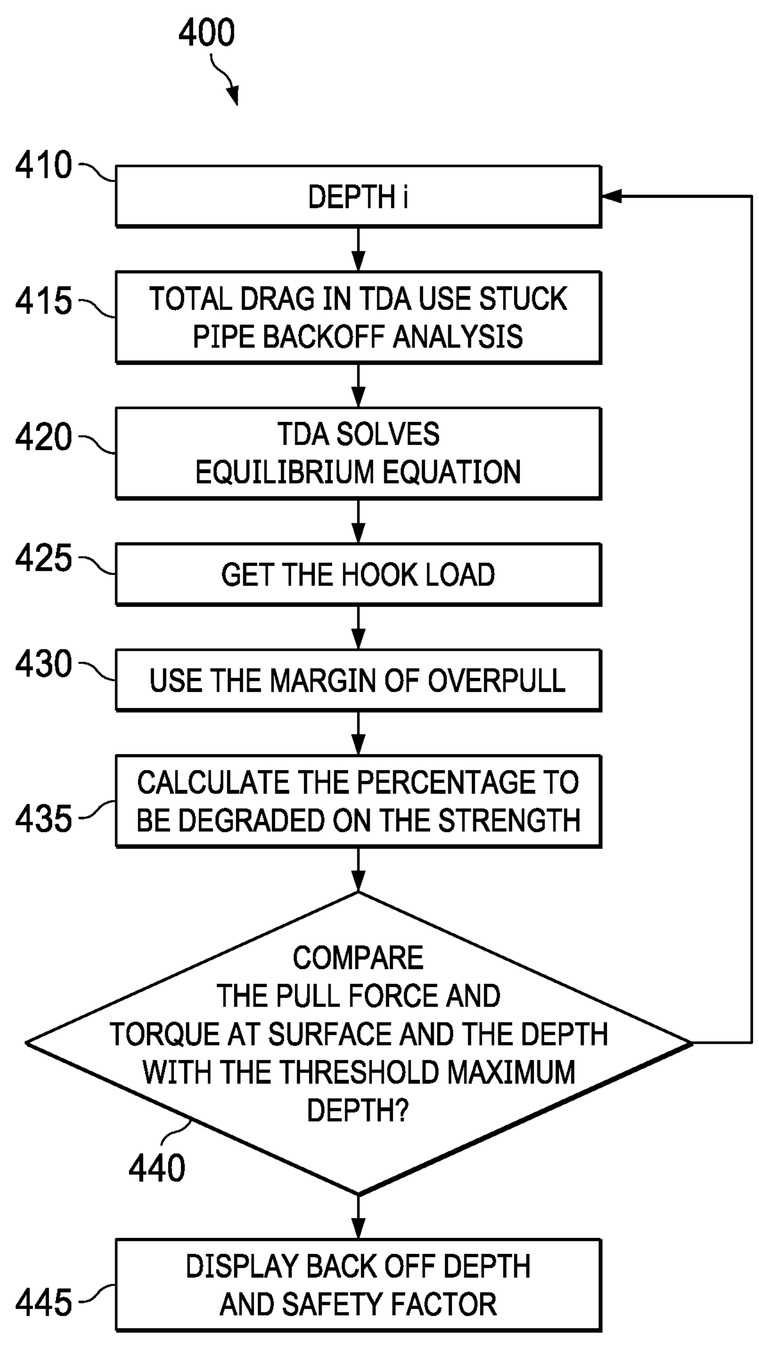
FIG. 4 is an illustration of a diagram of example functional flow calculating a pull force and a torque.

FIG. 4 is an illustration of a diagram of an example functional flow 400 calculating a pull force parameter and a torque parameter. Functional flow 400 demonstrates an example functional flow for the disclosed processes, and is similar to functional flow 300. Functional flow 400 starts in a block 410 where a depth i of interest can be specified. The depth can be a range of depths, for example, 15,300 feet to 15,400 feet. In a block 415, a TDA can be conducted utilizing stuck drill string backoff analysis. In a block 420, the TDA function can solve the equilibrium equations. In a block 425, the hook load can be determined. In a block 430, the margin of overpull can be calculated utilizing the known parameters of the drill string and the calculate drag forces.

In a block 435, the margin of overpull can be degraded by a percentage calculated from the von Mises stress parameters. In a block 440, the margin of overpull and torque experienced at the surface, such as at the travelling block, combined with the specified depth, can be compared to the threshold maximum depth. If the comparison is not satisfied, then the functional flow can return to block 410 and a deeper depth can be evaluated. If the comparison is satisfied that the maximum depth possible has been identified, that can be safely pulled out of the borehole by the surface equipment, in a block 445 the back off depth, safety factors, and other pull parameters can be utilized by the drilling operations or displayed to a user for user approval or intervention. A back-off operation is more cost effective than a cut and pull operation.

Figure 5:
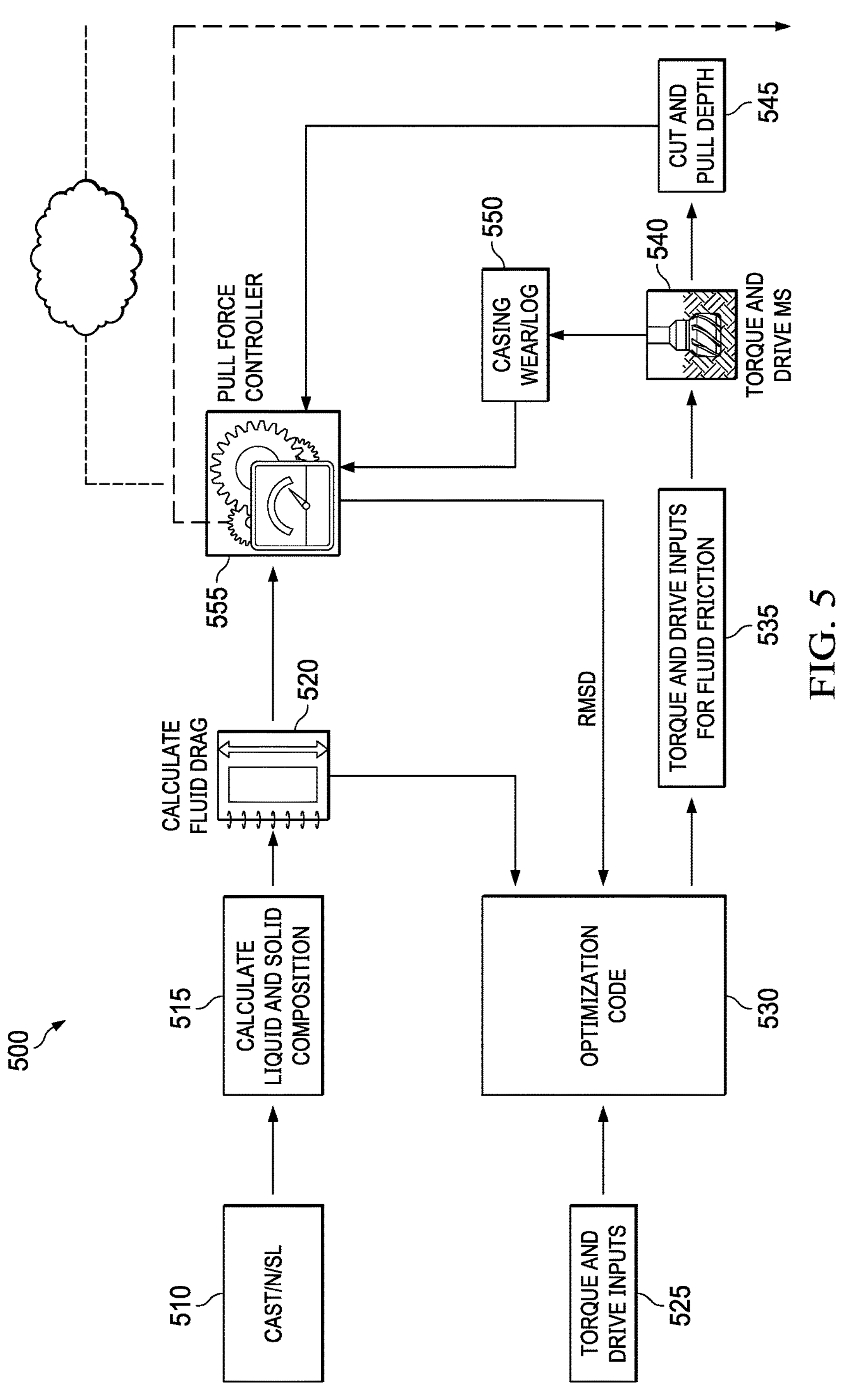
FIG. 5 is an illustration of a diagram of an example service flow utilizing example microservice functions.

FIG. 5 is an illustration of a diagram of an example service flow 500 utilizing example microservice functions. In some aspects, each function shown can be one or more microservices. In some aspects, a microservice can have one or more functions. Each microservice can be encapsulated as a software, hardware, or a combination thereof component. Service flow 500 demonstrations a functional implementation of the disclosed processes and methods using JavaScript Object Notation (JSON) and other types of components. In other aspects, service flow 500 can be implemented using other software or technical components, for example, other software languages, embedded instructions in hardware, or a combination thereof.

Service flow 500 has a function 510 which are input parameters relating to the composition of the mud pumped into the borehole, and how the mud has interacted with other material at the depth location of interest. For example, input parameters can be collected or measured relating to the mixing of the mud and hydrocarbons present at the specified depth of interest. In a function 515, the percentage of the mud that is of liquid composition and the percentage of the mud that is of solid composition can be calculated. In a function 520, the fluid drag can be calculated utilizing the input parameters and the calculated liquid and solid percentages, for example, see Equation 1.

In a function 525, torque and drive input parameters can be received, for example, from sensors located at or near the traveling block and hook for the drill string. In a function 530, the calculated fluid drag, and the torque and drive input parameters, can be analyzed and combined. In a function 535, the torque and drive input parameters can be adjusted for the fluid friction effects. In a function 540, the torque and drive input parameters can be adjusted. In a function 545, the cut and pull depth can be calculated, for example, as demonstrated in functional flow 300 of FIG. 3 or functional flow 400 of FIG. 4.

In a function 550, casing wear and other logging parameters can be incorporated in with the other parameters. In a function 555, the torque and drive input parameters, the cut and pull depth parameters, the casing wear and other logging parameters, and the other input parameters can be analyzed to calculate a pull force needed to overcome the stuck drill string. A back-off operation would be preferred over a cut and pull operation. Function 555 can determine which operation would be more beneficial for borehole operations. Function 555 can be part of a pull force controller, for example, pull force controller 800 of FIG. 8. The output of function 555 can be communicated to a user or to a drilling operation system for further action and implementation.

Figure 6:
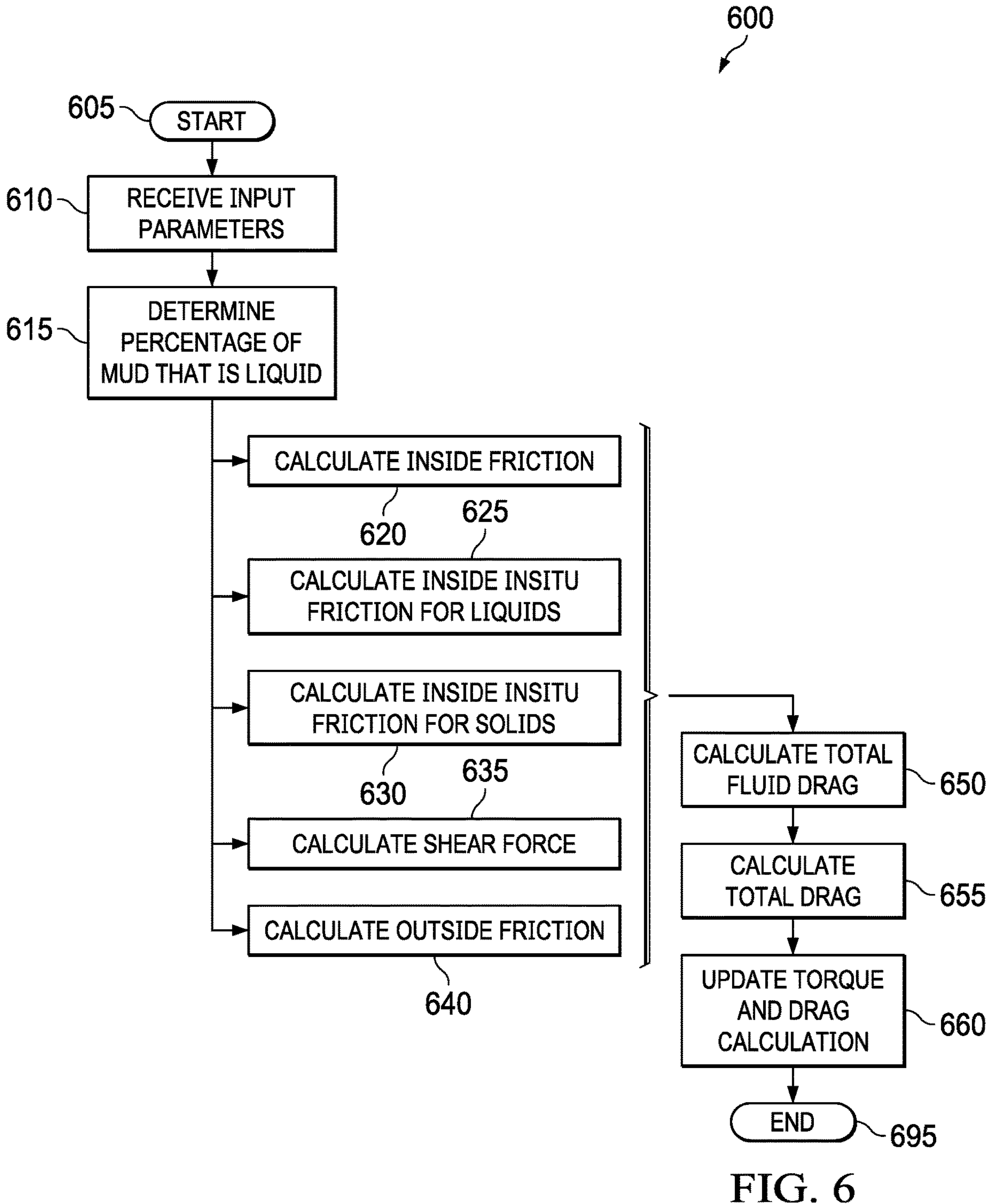
FIG. 6 is an illustration of a flow diagram of an example method to calculate a pull force.

FIG. 6 is an illustration of a flow diagram of an example method 600 to calculate a pull force. Method 600 can be performed on a computing system, such as a well site controller, a drilling controller, a geo-steering system, a BHA, an edge computing system, or other computing system capable of receiving the various survey parameters and inputs, and capable of communicating with equipment or a user at a borehole site. Other computing systems can be a smartphone, PDA, laptop computer, desktop computer, server, data center, cloud environment, or other computing system. Method 600 can be encapsulated in software code or in hardware, for example, an application, code library, dynamic link library, module, function, RAM, ROM, and other software and hardware implementations. The software can be stored in a file, database, or other computing system storage mechanism. Method 600 can be partially implemented in software and partially in hardware. Method 600 can perform the operations within the computing system or, in some aspects, generate a visual component, for example, a chart or graph showing the borehole depth and pull force. Method 600 can be performed partially or wholly by pull force modeler system 700 of FIG. 7 or pull force controller 800 of FIG. 8.

Method 600 starts at a step 605 and proceeds to a step 610. In step 610, input parameters can be received. Input parameters can be received from sensors in real-time or near real-time, such as downhole sensors, surface sensors, drilling string sensors, and drilling operation sensors. Input parameters can be received from one or more data sources, such as sensor data collected at a previous time interval or from laboratory testing, such as testing of material sag of a mud under various temperatures and pressures. Input parameters can also include instructions, data, and parameters to operate the method, such as a machine learning algorithm to use, a depth of interest, and other parameters.

The data sources can be one or more various data sources, such as a well site controller, a server, laptop, PDA, desktop computer, database, file store, cloud storage, data center, or other types of data stores, and be located downhole, at a surface location, proximate the borehole, distant from the borehole, in a lab, an office, a data center, or a cloud environment.

From step 610, method 600 proceeds to a step 615 where the percentage of liquid composition of the mud at the specified depth is calculated and the percentage of solid composition of the mud at the specified depth is calculated. In some aspects, step 615 can evaluate the orientation of the borehole at the specified depth or range of depths. If the orientation of the borehole is vertical or nearly vertical, a conventional pull force calculation can be made since the friction forces drop to approximately zero, and method 600 can end at a step 695. If the orientation of the borehole is not vertical or nearly vertical, method 600 proceeds to one or more steps of a step 620, a step 625, a step 630, a step 635, or a step 640, where these steps can be completed serially, in parallel, overlapped, or in various combinations thereof.

In step 620, the inside friction can be calculated for fluid located within the diameter of the drill string at the specified depth. In step 625, a calculation can be made for the insitu friction parameter for the liquid percentage of the mud. In step 630, a calculation can be made for the insitu friction parameter for the solid percentage of the mud. In step 635, a shear force can be calculated. In step 640, the friction experienced on the outside of the drill string can be calculated, such as fluid drag created by the casing collars or changes in the drag due to variations of the casing wear at various depths.

At the completion of the selected steps of step 620, step 625, step 630, step 635, and step 640, method 600 proceeds to a step 650. In step 650, the outputs of the previous steps are utilized to calculate the total fluid drag, for example, Equation 1. The output of step 650 is used in a step 655 to calculate the total drag, that includes mechanical drag and shear forces. In a step 660, the torque and drag calculations are updated with the total drag parameters. The output of step 660 can be utilized to determine the pull force needed to overcome the friction and drag forces, e.g., the overpull force. Method 600 ends at step 695.

Figure 7:
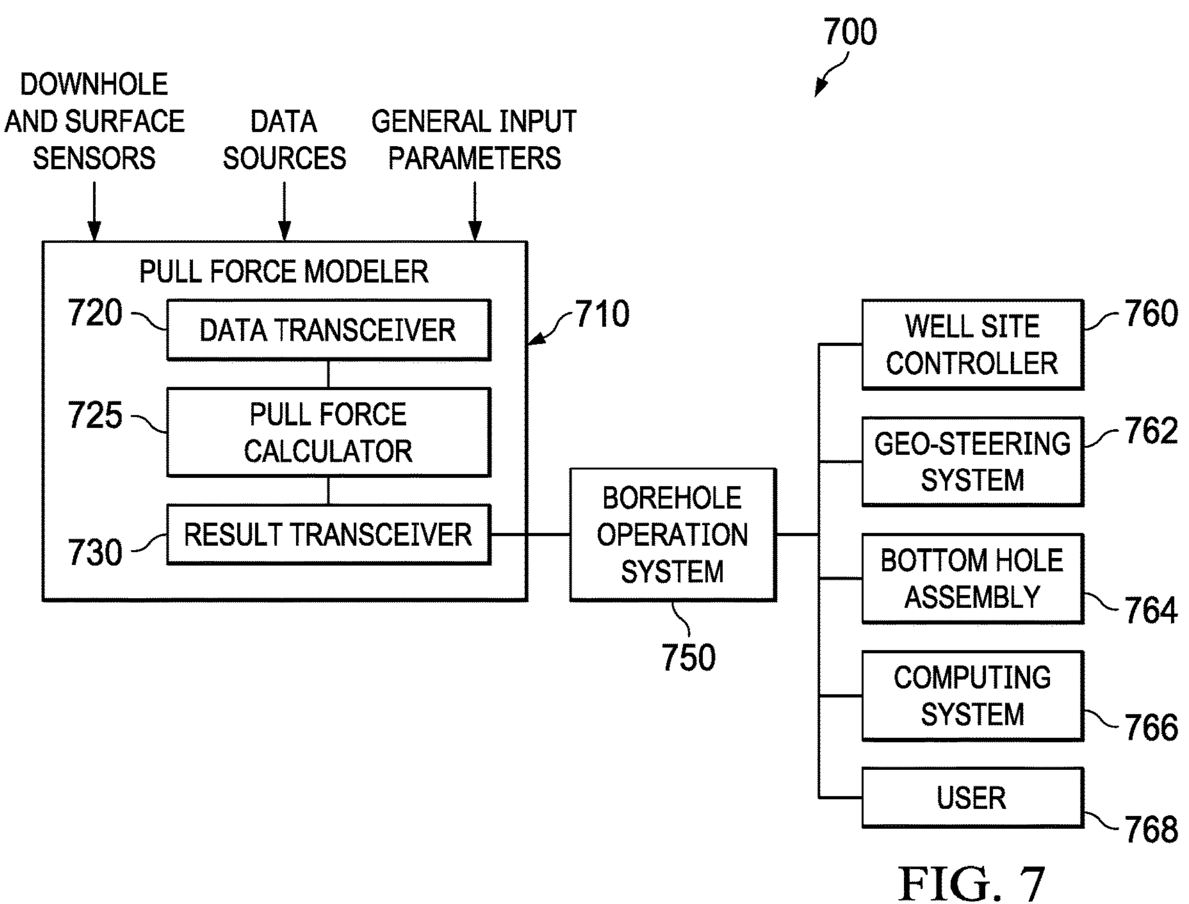
FIG. 7 is an illustration of a block diagram of an example pull force modeler system.

FIG. 7 is an illustration of a block diagram of an example pull force modeler system 700, which can be implemented in one or more computing systems, for example, a well site controller, a reservoir controller, a drilling controller, a data center, cloud environment, server, laptop, smartphone, tablet, an edge computing system, and other computing systems. The computing system can be located downhole, proximate the well site, or a distance from the well site, such as in a data center, cloud environment, or corporate location. Pull force modeler system 700 can be implemented as an application, a code library, a dynamic link library, a function, module, other software implementation, or combinations thereof. In some aspects, pull force modeler system 700 can be implemented in hardware, such as a ROM, a graphics processing unit, or other hardware implementation. In some aspects, pull force modeler system 700 can be implemented partially as a software application and partially as a hardware implementation. In some aspects, pull force modeler system 700 can be implemented wholly or partially by pull force controller 800 of FIG. 8.

Pull force modeler system 700 includes a pull force modeler 710 which further includes a data transceiver 720, a pull force calculator 725, and a result transceiver 730. Data transceiver 720 can receive input parameters (such as downhole parameters on the conditions within the borehole or the composition of the mud, surface parameters on the drag and torque of the drill string, e.g., hook load, and other input parameters), real-time or near real-time sensor data from one or more downhole sensors or surface sensors (such as temperature parameters or pressure parameters), input parameters from previous survey data (such as sensor data collected at a previous time interval), and input parameters from a data store (such as laboratory test results or data from proximate boreholes). Data transceiver 720 is capable of receiving input parameters for one or more portions of the borehole (such as at one or more depths or ranges of depths).

The input parameters can include parameters, instructions, directions, data, and other information to enable or direct the remaining processing of pull force modeler system 700. The data store can be one or more data stores, such as a database, a data file, a memory, a server, a laptop, a server, a data center, a cloud environment, or other types of data stores located proximate pull force modeler 710 or distant from pull force modeler 710.

Data transceiver 720 can receive the data and parameters from one or more sensors located proximate the drilling system or located elsewhere in the borehole or at a surface location. In some aspects, data transceiver 720 can receive various data from a computing system, for example, when a controller or computing system collects the data from the sensors and then communicates the data to data transceiver 720. The measurements collected by the sensors can be transformed into input parameters by the sensors, data transceiver 720, or another computing system.

Result transceiver 730 can communicate one or more calculated results, e.g., result parameters, to one or more other systems, such as a geo-steering system, a geo-steering controller, a well site controller, a drilling controller, a computing system, a BHA, drilling system, a user, or other borehole related systems. Other borehole related systems can include a computing system where pull force modeler 710 is executing or be located in another computing system proximate or distant from pull force modeler 710. Data transceiver 720 and result transceiver 730 can be, or can include, conventional interfaces configured for transmitting and receiving data. In some aspects, data transceiver 720 and result transceiver 730 can be combined into one transceiver. In some aspects, data transceiver 720, pull force calculator 725, and result transceiver 730 can be combined into one component. In some aspects, data transceiver 720 and result transceiver 730 can be implemented using communications interface 810 of FIG. 8. In some aspects, pull force calculator 725 can be a pull force processor.

Pull force calculator 725 can implement the methods, processes, analysis, and algorithms as described herein utilizing the received data and input parameters, or at least some of the received data and input parameters, to determine, in some aspects, a minimum pull force, e.g., an overpull force, to remove a stuck state of a stuck drill string. In some aspects, pull force calculator 725 can determine adjusted input parameters using an output from a machine learning system or deep neural network system. In some aspects, pull force calculator 725 can use one or more algorithms and systems, such as a machine learning system, a deep neural network system, a decision tree algorithm, a random forest algorithm, a logistic regression algorithm, a linear algorithm, a stochastic algorithm, and other statistical algorithms. In some aspects, pull force calculator 725 can utilize a weight distribution model to ascertain an overpull force when one or more of the input parameters are uncertain or estimated. In some aspects, pull force calculator 725 can utilize the algorithm represented by Equation 5 to generate the overpull force.

Figure 8:
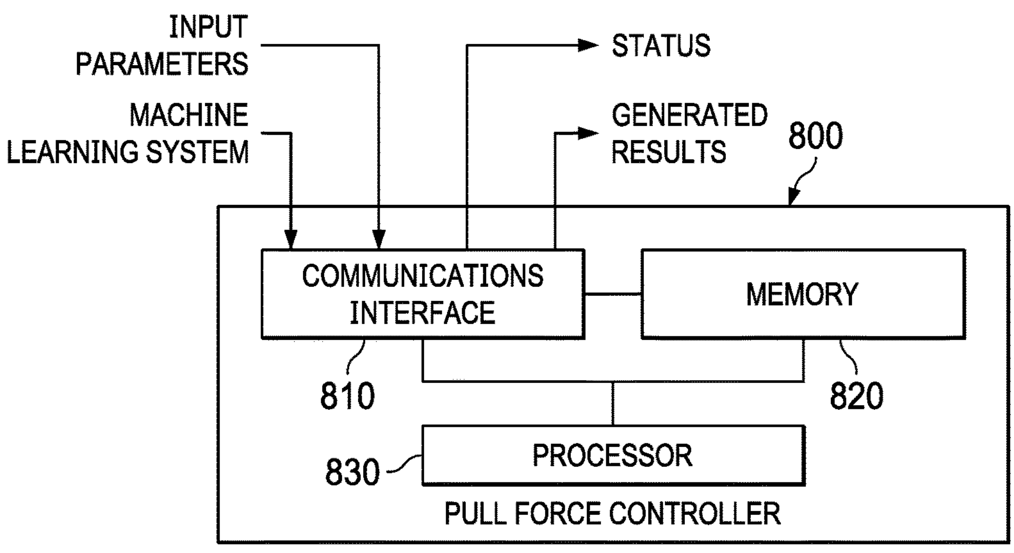
FIG. 8 is an illustration of a block diagram of an example of a pull force controller according to the principles of the disclosure.

In some aspects, pull force calculator 725 can be implemented using instructions and data utilizing processor 830 of FIG. 8. In some aspects, pull force calculator 725 can implement one or more of the functions described in service flow 500 of FIG. 5. A memory or data storage of pull force calculator 725 or pull force modeler 710 can be configured to store the processes and algorithms for directing the operation of pull force calculator 725.

The results from pull force modeler 710 can be communicated to another system, such as a borehole operation system 750. Borehole operation system 750 can be one or more of a controller 760 (such as a well site controller, a drilling controller, or another controller), a geo-steering system 762, a BHA 764, a computing system 766, or a user 768. In aspects where user 768 receives the results, the results can include a visualization of the results, such as an identified backoff depth, a threshold depth, a safety factor, or other visualizations to assist the user in further decision making. The results can be used to direct the borehole operation system 750 in specifying the amount of overpull force to exert on the drill string, or performing other remediation operations.

FIG. 8 is an illustration of a block diagram of an example of pull force controller 800 according to the principles of the disclosure. Pull force controller 800 can be stored on a single computer or on multiple computers. The various components of pull force controller 800 can communicate via wireless or wired conventional connections. A portion or a whole of pull force controller 800 can be located downhole at one or more locations and other portions of pull force controller 800 can be located on a computing device or devices located at the surface or a distant location from the borehole. In some aspects, pull force controller 800 can be wholly located at a surface or distant location. In some aspects, pull force controller 800 is part of a geo-steering system, and can be integrated in a single device. In some aspects, pull force controller 800 can be an edge computing system.

Pull force controller 800 can be configured to perform the various functions disclosed herein including receiving input parameters and generating results from an execution of the methods and processes described herein. In some aspects, pull force controller 800 can implement one or more of the functions described in service flow 500 of FIG. 5. Pull force controller 800 includes a communications interface 810, a memory 820, and a processor 830.

Communications interface 810 is configured to transmit and receive data. For example, communications interface 810 can receive the input parameters. Communications interface 810 can transmit the calculated pull force, depth threshold or backoff depth, a safety factor, and other generated results. In some aspects, communications interface 810 can transmit a status, such as a success or failure indicator of pull force controller 800 regarding receiving the input parameters, transmitting the generated results, or producing the generated results. In some aspects, communications interface 810 can receive input parameters from a machine learning system, such as when the input parameters are pre-processed by a machine learning system or a deep neural network system prior to being utilized as an input into the described processes and methods. Communications interface 810 can communicate via communication systems used in the industry. For example, wireless or wired protocols can be used. Communication interface 810 is capable of performing the operations as described for data transceiver 720 and result transceiver 730.

Memory 820 can be configured to store a series of operating instructions that direct the operation of processor 830 when initiated, including the code representing the algorithms for calculating the pull force, as well as data, parameters, and other information. Memory 820 is a non-transitory computer readable medium. Multiple types of memory can be used for data storage and memory 820 can be distributed.

Processor 830 can be configured to produce the generated results, including the calculated pull force, threshold depth or backoff depth, safety factors, and statuses utilizing the received input parameters, and, if provided, the machine learning system or deep neural network system inputs. For example, processor 830 can perform an analysis of the input parameters and adjust the torque and drag parameters as measured at the traveling block to calculate an overpull force. Processor 830 can be configured to direct the operation of pull force controller 800. Processor 830 includes the logic to communicate with communications interface 810 and memory 820, and perform the functions described herein. Processor 830 is capable of performing or directing the operations as described by pull force calculator 925.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each aspect as disclosed in the SUMMARY section can have one or more of the following additional elements in combination. Element 1: communicating the overpull force to a well site controller, a drilling controller, or a user. Element 2: adjusting a drilling operation of the borehole using the overpull force. Element 3: wherein the adjusting further comprises: Element 4: initiating a drill string stuck remediation utilizing the overpull force. Element 5: producing a visualization of the overpull force. Element 6: identifying a threshold depth and a safety factor utilizing the input parameters and the total drag. Element 7: identifying a backoff depth and a safety factor utilizing the input parameters and the total drag. Element 8: wherein the receiving, the determining, the first calculating, the second calculating, and the updating are repeated for a second depth. Element 9: wherein the first depth and the second depth represent a range of depths. Element 10: transforming the input parameters utilizing a machine learning system or a deep neural network system. Element 11: wherein the input parameters further comprise at least one of a fluid composition of the mud at the first depth, a pressure parameter at the first depth, a temperature parameter at the first depth, a casing wear at the first depth, a relative position of casing collars to the first depth, a relative position of tool joints to the first depth, a material sag parameter at the first depth, a bonding characteristic of borehole materials of the mud, or a borehole geometry at the first depth. Element 12: determining the fluid composition utilizing laboratory testing or borehole logging tools. Element 13: wherein at least one of the receiving, the determining, the first calculating, the second calculating, or the updating is encapsulated as a function or a microservice accessible by other functions or microservices. Element 14: wherein the drilling controller is capable of receiving the output parameter and of initiating a remediation operation utilizing the overpull force. Element 15: wherein the data transceiver, the result transceiver, and the pull force processor is part of one or more of the well site controller, the drilling controller, a geo-steering system, a bottom hole assembly, or the computing system. Element 16: wherein the output parameter further comprises a visualization of the overpull force, the threshold depth, or the backoff depth, and a user initiates a remediation utilizing the output parameter. Element 17: wherein the pull force processor is further capable of utilizing a machine learning system or a deep neural network system to transform the input parameters. Element 18: wherein the data transceiver receives input parameters at one or more additional depths or depth ranges. Element 19: wherein the fluid composition is determined utilizing laboratory testing.

What is claimed is:

1. A method, comprising:

receiving input parameters of at least a torque parameter and a drag parameter for a drill string, wherein the drill string is in a stuck state in a borehole and the receiving is at a time when at least some material sag of a drilling mud, located outside of the drill string, has occurred at a first depth at a downhole location in the borehole; and determining a backoff depth at which to conduct a backoff operation of the drill string using the first depth threshold and an overpull force to be applied to a drill string hook coupled to the drill string for that backoff depth, comprising:

ascertaining a percentage of liquid of the drilling mud at the first depth and a percentage of solids of the drilling mud that have settled out due to the at least some material sag at the first depth;

computing a first insitu friction parameter utilizing the percentage of liquid and a second insitu friction parameter utilizing the percentage of solids;

calculating a total drag utilizing terms that include a mechanical drag, the first insitu friction parameter, the second insitu friction parameter, and a fluid drag of a fluid inside the drill string, wherein each of the terms is calculated over a length of a portion of the drill string being evaluated; and generating the overpull force utilizing the total drag to update the torque parameter and the drag parameter, wherein the overpull force is sufficient to move the drill string from the stuck state.

2. The method as recited in claim 1, further comprising:

communicating the overpull force to a well site controller, a drilling controller, or a user; and adjusting a drilling operation of the borehole using the overpull force.

3. The method as recited in claim 1, further comprising: initiating a drill string stuck remediation utilizing the overpull force.

4. The method as recited in claim 1, further comprising: producing a visualization of the overpull force.

5. The method as recited in claim 1, wherein the generating further comprises:

identifying a safety factor utilizing the overpull force, wherein the safety factor is used by a drilling operation for decision making.

6. The method as recited in claim 1, wherein the determining further comprises:

evaluating a deeper backoff depth until a maximum depth is identified where the drill string can be safely pulled out of the borehole by the drill string hook, wherein the deeper backoff depth is determined by a parameter included with the input parameters.

7. The method as recited in claim 1, wherein the determining is repeated for a second depth within the borehole.

8. The method as recited in claim 7, wherein the first depth and the second depth represent a range of depths.

9. The method as recited in claim 1, further comprising:

transforming the input parameters utilizing a machine learning system or a deep neural network system; and wherein the terms for the total drag calculation further includes one or more of an inside friction parameter at the first depth, a shear force at the first depth, or an outside friction at the first depth.

10. The method as recited in claim 1, wherein the input parameters comprise at least one of a fluid composition of the mud at the first depth, a pressure parameter at the first depth, a temperature parameter at the first depth, a casing wear at the first depth, a relative position of casing collars to the first depth, a relative position of tool joints to the first depth, a material sag parameter at the first depth, a bonding characteristic of borehole materials of the mud, or a borehole geometry at the first depth.

11. The method as recited in claim 10, further comprising: determining the fluid composition utilizing laboratory testing or borehole logging tools.

12. The method as recited in claim 1, wherein at least one of the receiving, the determining, the ascertaining, the computing, the calculating, or the generating is encapsulated as a function or a microservice accessible by other functions or microservices.

13. A system, comprising:

a data transceiver, capable of receiving input parameters from one or more of downhole sensors of a borehole undergoing drilling operations, surface sensors proximate the borehole, a data store, a previous survey data, a well site controller, a drilling controller, or a computing system, wherein the input parameters include sensor data of a fluid composition of a mud at a first depth in the borehole, a drill string is coupled to a surface location and extends into the borehole, the drill string is in a stuck state, and wherein the fluid composition comprises a percentage of liquid of the mud and a percentage of solids of the mud that have settled out of the mud at a time when at least some material sag has occurred at the first depth;

a result transceiver, capable of communicating an output parameter; and a pull force processor, capable of using at least one of the input parameters and a first insitu friction parameter and a second insitu friction parameter to generate the output parameter, wherein a first insitu friction parameter is determined from the percentage of liquid and the second insitu friction parameter is determined from the percentage of solids, and calculating a total drag utilizing terms that include a shear force, the first insitu friction parameter, the second insitu friction parameter, and a fluid drag of a fluid inside the drill string, wherein each of the terms is calculated over a length of a portion of the drill string being evaluated, and where the output parameter comprises at least an overpull force and a backoff depth, the overpull force is sufficient to conduct a back-off operation of the drill string at the backoff depth, the overpull force is applied to a drill string hook coupled to the drill string, and the overpull force utilizes a safety factor.

14. The system as recited in claim 13, wherein the drilling controller is capable of receiving the output parameter and of initiating a remediation operation utilizing the overpull force.

15. The system as recited in claim 13, wherein the data transceiver, the result transceiver, and the pull force processor is part of one or more of the well site controller, the drilling controller, a geo-steering system, a bottom hole assembly, or the computing system.

16. The system as recited in claim 13, wherein the output parameter further comprises a visualization of the overpull force, a threshold depth, or the backoff depth, and a user initiates a remediation utilizing the output parameter.

17. The system as recited in claim 13, wherein the pull force processor is further capable of utilizing a machine learning system or a deep neural network system to transform the input parameters.

18. The system as recited in claim 13, wherein the data transceiver receives input parameters at one or more additional depths or depth ranges.

19. The system as recited in claim 13, wherein the fluid composition is determined utilizing laboratory testing.

* * * * *